United States Patent
Grinshpun et al.

(10) Patent No.: US 9,967,300 B2
(45) Date of Patent: May 8, 2018

(54) METHOD AND APPARATUS FOR SCHEDULING ADAPTIVE BIT RATE STREAMS

(71) Applicant: ALCATEL-LUCENT USA, INC., Murray Hill, NJ (US)

(72) Inventors: Edward Grinshpun, Freehold, NJ (US); David Faucher, Guthrie Center, IA (US); Stefan Valentin, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 551 days.

(21) Appl. No.: 13/710,177

(22) Filed: Dec. 10, 2012

(65) Prior Publication Data

US 2014/0161050 A1    Jun. 12, 2014

(51) Int. Cl.
| | |
|---|---|
| H04L 29/06 | (2006.01) |
| H04N 21/239 | (2011.01) |
| H04N 21/24 | (2011.01) |
| H04W 72/04 | (2009.01) |

(52) U.S. Cl.
CPC ........ *H04L 65/4069* (2013.01); *H04L 65/604* (2013.01); *H04N 21/2393* (2013.01); *H04N 21/2408* (2013.01); *H04W 72/04* (2013.01)

(58) Field of Classification Search
CPC ........ H04W 28/02; H04W 72/04; H04L 65/60
See application file for complete search history.

(56) References Cited

U.S. PATENT DOCUMENTS

| | | | |
|---|---|---|---|
| 6,112,226 A | * | 8/2000 | Weaver et al. ............... 709/203 |
| 2008/0022005 A1 | * | 1/2008 | Wu ..................... H04L 65/4069 709/231 |
| 2011/0082946 A1 | * | 4/2011 | Gopalakrishnan ............ 709/231 |
| 2011/0093605 A1 | * | 4/2011 | Choudhury et al. .......... 709/231 |
| 2012/0195369 A1 | * | 8/2012 | Guerrero ................. 375/240.02 |
| 2012/0281536 A1 | | 11/2012 | Gell et al. |

(Continued)

FOREIGN PATENT DOCUMENTS

| | | |
|---|---|---|
| WO | 2004030286 A1 | 4/2004 |
| WO | 2006075951 | 7/2006 |

(Continued)

OTHER PUBLICATIONS

International Search Report and Written Opinion correlating to PCT/US2013/071442 dated Mar. 6, 2014, 12 pages.

(Continued)

*Primary Examiner* — Andrew Lai
*Assistant Examiner* — M Mostazir Rahman
(74) *Attorney, Agent, or Firm* — Davidson Sheehan LLP

(57) ABSTRACT

Embodiments of the claimed subject matter provide a method and apparatus for scheduling adaptive bit rate streams. Some embodiments of the method include accessing, at user equipment, a first bit rate selected from a plurality of bit rates used to encode a portion of an adaptive multimedia stream, a size of the portion of the adaptive multimedia stream, and a play out duration of the portion of the adaptive multimedia stream. Some embodiments of the method also include providing, from the user equipment, indications of the first bit rate, the size, and the play out duration.

30 Claims, 4 Drawing Sheets

(56) References Cited

U.S. PATENT DOCUMENTS

2013/0290493 A1* 10/2013 Oyman ............... H04B 7/0486
709/219
2014/0219088 A1* 8/2014 Oyman et al. ............... 370/231
2015/0156243 A1* 6/2015 Skog .................... H04L 65/605
709/219

FOREIGN PATENT DOCUMENTS

| WO | 20110047335 | 4/2011 |
|----|-------------|--------|
| WO | WO2012/009485 | 1/2012 |
| WO | WO2012/092602 | 7/2012 |

OTHER PUBLICATIONS

"Secure Streaming Support with Variable Bitrates", OMA-DRM WG, May 15, 2009, 16 pages.
Davy Van Deursen et al. "On Media Delivery Protocols in the Web", Multimedia and Expo (ICME), 2010 IEEE International Conference, Jul. 19, 2010, 6 pages.
3rd Generation Partnership Project, Technical Specification Group Services and System Aspects; Transparent End-to-End Packet-switched Streaming Service (PSS); Progressive Download and Dynamic Adaptive Streaming over HTTP (3 GP-DASH) (Release 11)m Sep. 12, 2012, 112 pages.
Office Action, dated Sep. 30, 2015, for corresponding Japanese Patent Application No. 2015-503693, 6 pages.
Office Action, dated Feb. 4, 2016, for corresponding Japanese Patent Application No. 2015-503693, 2 pages.

* cited by examiner

METHOD AND APPARATUS FOR SCHEDULING ADAPTIVE BIT RATE STREAMS

BACKGROUND

This application relates generally to communication systems, and, more particularly, to wireless communication systems.

Wireless communication systems typically include a network of base stations and base station control network entities such as a Mobility Management Entity (MME), a serving gateway (SGW), or a public data network (PDN) gateway that provide wireless connectivity to user equipment. For example, the base station control entities may set up flows over an air interface to the user equipment and then the base station may schedule communication with the user equipment based upon the flow parameters. User equipment may include devices such as cellular phones, smart phones, tablets, ultrabooks, laptops, wireless-enabled desktop computers, and the like. The wireless communication system may support communication between different users, e.g., phone calls, text messaging, or email. The wireless communication system may also support streaming of media, e.g., from one or more servers to user equipment. For example, programming such as live sporting events or archived movies or television shows can be unicast, multicast, or broadcast to user equipment so that users can watch or listen to the programming on their user equipment.

Adaptive bit-rate streaming can be used to provide programming or other content to user equipment. Adaptive bit rate streaming allows a client device to select one of a set of multiple bit rates for receiving source audio, video, multimedia or other information. For example, an encoder may encode a source input stream at multiple bit rates ranging from a relatively low bit rate to a relatively high bit rate to form a set of adaptive bit rate streams. The encoder or a separate segmenting function divides the different bit-rate streams into segments that have a predetermined duration. The content may be pre-encoded, segmented, and stored on a server (e.g., for archived movies or television programs) or it may be encoded, segmented and provided to the server in real-time (e.g., for live programming). The client may receive a manifest file that includes information identifying the different available bit rates and the length of the encoded segments. Once the media streaming session begins, the client can select different bit-rate encodings for each segment of the stream. For example, the client may request higher bit rate encodings for upcoming segments when the client determines that the estimated network throughput is higher than the bit rate selected for the current segment. The client may also request lower bit rate encodings if the estimated network throughput is lower than the bit-rate selected for the current segment. HTTP Adaptive Streaming (HAS) is rapidly becoming the preferred technology for watching pre-encoded video content on mobile devices.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Data transmitted in adaptive bit rate streams by wireless communication systems may be subject to at least three different independent control loops. A first application-level control loop is established between the adaptive bit-rate server in the network and the client in the user equipment. A second control loop is established between transmission control protocol/Internet protocol (TCP/IP) stacks of the user equipment and the adaptive bit-rate server in the network to perform TCP congestion management. A third control loop is established between the base station and the user equipment to perform scheduling of transmissions over the air interface. Wireless communication systems typically use best effort (which does not provide quality of service guaranties) over the air interface connections (flows) to transmit adaptive bit rate streaming application content. Over the air transmission for a specific connection is governed by the base station scheduler that schedules transmission of the data according to the flow parameters. Suboptimal scheduling of the best effort traffic (e.g., in the third control loop) occurs when the third control loop is out of synchronization with the first and second control loops and may have a severe impact on the quality of experience of users viewing media received from the adaptive bit-rate server.

Adaptive bit rate streaming may also contribute to network congestion. For example, from the perspective of a wireless service provider, over-the-top adaptive bit rate streaming traffic is considered one of the main contributors to network congestion. Systems that operate according to the fourth generation, Long Term Evolution (4G LTE) standards or protocols support higher resolution and bigger screens on smartphones and tablets to provide higher resolution video. The likelihood of network congestion may therefore increase with the resulting increase of audio, video, or multimedia traffic (and HAS in particular, as the predominant form of viewing pre-encoded video content) as 4G LTE systems are deployed. Resolving congestion caused by adaptive bit rate streaming is therefore becoming much more important. Moreover, many clients may use the same air interface resources for receiving the data streams and the over-the-air link is likely to become a bottleneck. Greedy non-cooperating client behavior where each client tries to obtain maximal available cell throughput further contributes to the problem, while adding unfairness in video quality distribution.

The disclosed subject matter is directed to addressing the effects of one or more of the problems set forth above.

In one embodiment, a method is provided for supporting the scheduling of adaptive bit rate streams. Some embodiments of the method include accessing, at user equipment, a first bit rate selected from a plurality of bit rates used to encode a portion of an adaptive multimedia stream, a size of the portion of the adaptive multimedia stream, and a play out duration of the portion of the adaptive multimedia stream. Some embodiments of the method also include providing, from the user equipment, indications of the first bit rate, the size, and the play out duration.

In another embodiment, a method is provided for supporting the scheduling adaptive bit rate streams. Some embodiments of the method include receiving, at a base station, indications of one or more first bit rates selected by one or more user equipment from a plurality of bit rates used to encode one or more portions of an adaptive multimedia stream, one or more sizes of the portion(s) of the adaptive multimedia stream, and one or more play out durations of the portion of the adaptive multimedia stream. Embodiments of the method also include allocating one or more resources for transmission of the portion(s) of the adaptive multimedia stream to the user equipment based on the indications of the first bit rate(s), size(s), and play out duration(s).

In yet another embodiment, user equipment is provided for assisting in scheduling adaptive bit rate streams. Some embodiments of the user equipment are configurable to access a first bit rate selected from a plurality of bit rates used to encode a portion of an adaptive multimedia stream, a size of the portion of the adaptive multimedia stream, and a play out duration of the portion of the adaptive multimedia stream. Some embodiments of the user equipment are also configurable to provide indications of the first bit rate, the size, and the play out duration.

In a further embodiment, a base station is provided for scheduling adaptive bit rate streams. Some embodiments of the base station include a receiver configurable to receive indications of one or more first bit rates selected by one or more user equipment from a plurality of bit rates used to encode one or more portions of an adaptive multimedia stream, one or more sizes of the portion(s) of the adaptive multimedia stream, and one or more play out durations of the portion of the adaptive multimedia stream. Embodiments of the base station also include a scheduler configurable to allocate one or more resources for transmission of the portion(s) of the adaptive multimedia stream to the user equipment based on the indications of the first bit rate(s), size(s), and play out duration(s).

BRIEF DESCRIPTION OF THE DRAWINGS

The disclosed subject matter may be understood by reference to the following description taken in conjunction with the accompanying drawings, in which like reference numerals identify like elements, and in which.

Figure 1:
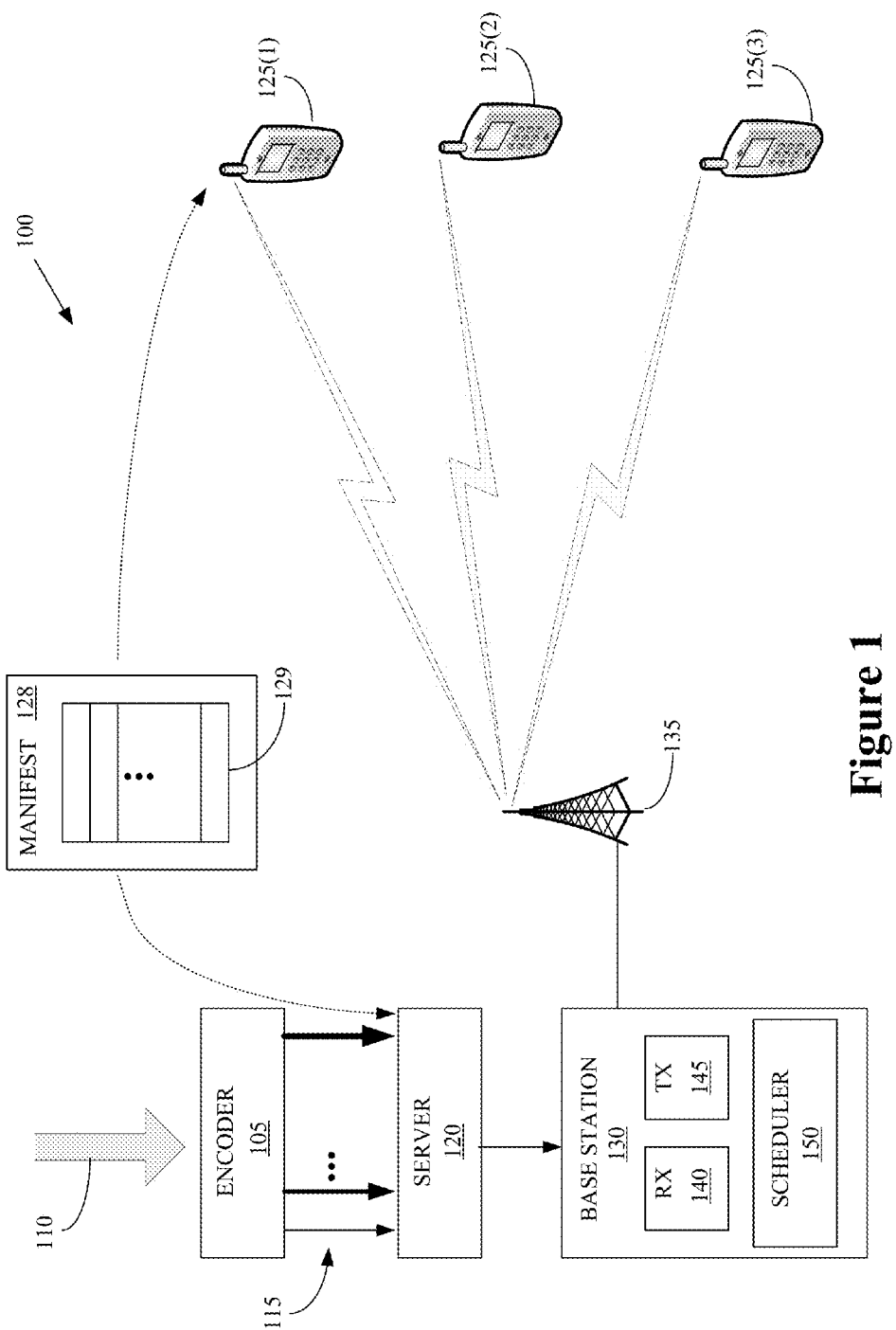
FIG. 1 conceptually illustrates a first exemplary embodiment of a wireless communication system that supports adaptive bit rate streaming.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, the multiple control loops involved in adaptive bit rate streaming can lead to suboptimal scheduling of data streams from base stations to user equipment. Adaptive bit rate streaming may also contribute to network congestion. Embodiments of user equipment described herein can therefore be configured to transmit information to a base station that indicates a bit rate of a segment of a data stream selected from a plurality of data streams encoded at different bit rates. The user equipment also transmits information indicating a size of the segment and a duration of a portion of the data stream encoded at the selected bit rate. For example, the user equipment may transmit information indicating a play out duration of the segment of the data stream when it is played by the user equipment. Some embodiments of the user equipment may also transmit information indicating a tolerable average throughput for the duration of the requested portion of the data stream or information. Some embodiments of the user equipment may also transmit information indicating a transmission control protocol (TCP) window state of a client implemented on the user equipment.

Some embodiments of the base stations described herein may be configured to use the information indicating the duration of the portion of the data stream to schedule transmission of the selected data stream to the user equipment. Some embodiments of the base station may also use the information indicating the tolerable average throughput or the client TCP window state to schedule transmissions to the user equipment. The base station may perform the scheduling by determining scheduling weights for the user equipment based on the requested bit rate, maintaining a minimum rate constraint, or some combination thereof. The base station may also be able to detect or predict future congestion using the requested bit rates and the durations of the corresponding segments for all users, as well as location and environmental information associated with the users. For example, congestion may be detected when the weighted sum of the requested bit rates (which may be adjusted for the signal quality information that may indicate the throughput for individual users and which may take into account user location relative to the base station, antenna geometry, topology and environment information) from user equipment served by the base station exceeds the throughput capacity of the air interface.

FIG. 1 conceptually illustrates a first exemplary embodiment of a wireless communication system 100 that supports adaptive bit rate streaming. In the illustrated embodiment, the wireless communication system 100 includes an encoder 105 that can receive an input data stream 110 such as a data stream 110 that includes audio, video, or multimedia information. The encoder 105 can encode the input data stream 110 at different bit rates to form output data streams 115 that are encoded at different bit rates. For example, the output data streams 115 may be encoded at bit rates that range from a relatively low bit rate to a relatively high bit rate. Higher resolution yields better picture quality and requires more bandwidth to support the higher bit rate streams used to convey higher resolution data. The encoder 105 may be used to pre-encode content that can be later stored before presentation to a user or the encoder 105 may encode content in real-time, e.g. for the presentation of live programming. Some embodiments of the encoder 105 may include segmenting functionality for segmenting the pre-encoded or encoded content. Other embodiments may implement a separate segmenting function (not shown in FIG. 1). The values of the bit rates, the numbers of different bit rates or data streams, and the differences between the bit rates used to encode the different output data streams 115 are matters of design choice. Exemplary adaptive bit rate technologies include, but are not limited to, HTTP Adaptive Streaming (HAS), MPEG Dynamic Adaptive Streaming over HTTP (DASH), Microsoft IIS SmoothStreaming, Apple HTTP Livestreaming, and Adobe flash technologies.

The wireless communication system 100 also includes a server 120 that supports adaptive bit rate streaming. The server 120 depicted in FIG. 1 hosts multiple encodings of the same audio, video, or other multimedia content at different bitrate resolutions. For example, the server 120 may receive the different bit-rate streams 115 from the encoder 105 and may store or buffer portions of the bit rate streams 115 for subsequent provision to requesting users. For example, the server 120 may store pre-encoded content for presentation upon request or the server 120 may buffer portions of a real-time data stream used to provide live programming. Some embodiments of the server 120 may divide or segment the content at each resolution into small video segments, e.g., if the encoder 105 does not include segmenting functionality. For example, the information conveyed in the different bit-rate streams 115 may be divided into segments that are 2-5 seconds in length and then the segments may be stored or buffered in the server 120. Other embodiments of the server 120 may receive and store or buffer segmented content from the encoder 105 or a separate segmenting function. As used herein, the term "adaptive multimedia stream" refers to a data stream that provides audio, video, or other multimedia content to user equipment at an encoded bit rate that is selected by the user equipment.

User equipment 125 may receive the content provided in the input data stream 110 at different data rates by selecting from among the data rates supported by the adaptive bit rate encoder 105 and server 120. In the illustrated embodiment, a client application implemented in the user equipment 125 can select a different bit rate for each segment of the content stored in the server 120. The user equipment 125 may therefore seamlessly switch the bitrate resolution by requesting that the next segment be provided to the user equipment 125 from the server 120 at a different bitrate. Lower requested bit rates result in lower audio, video, or multimedia quality at the user equipment 125 and result in a smaller segment size for the same play out duration that may generate a lower load on the network. Each user equipment 125 can independently select bit rates and the play out duration of the portion of the content that is to be transmitted at that bit rate (e.g., a number of segments to be transmitted at the selected bit rate). For example, user equipment 125(1) may select a relatively low bit rate, user equipment 125(2) may select a middling bit rate, and user equipment 125(3) may select a relatively high bit rate.

A manifest file 128 may be used to store information related to the adaptive bit rate service. Some embodiments of the manifest file 128 may include information 129 such as information that indicates available bitrates, encodings, segments (e.g., segment identifiers or the duration of segments) and instructions on how to request the content. The manifest file 128 may then be provided to or accessed by entities within the wireless communication system 100. For example, the encoder 105, the server 120, or the user equipment 125 may be able to access the information 129 stored in the manifest file 128 and use this information for providing or receiving the adaptive bit-rate services. Some embodiments of the manifest file 128 may be stored in the encoder 105, the server 120, or the user equipment 125.

A base station 130 may be used to transmit or receive information over the air interface between an antenna 135 and user equipment 125. As used herein, the term "base station" refers to base stations, eNodeBs, base station routers, access networks, access points, macrocells, microcells, picocells, femtocells, and the like. The base station 130 receives adaptive bit rate streaming content from the server 120. Persons of ordinary skill in the art having benefit of the present disclosure should appreciate that the wireless communication system 100 may include additional networks or functionality between the server 120 and the base station 130. For example, the server 120 and the base station 130 may communicate via gateways, networks, routers, or other elements. In the interest of clarity, these conventional elements are not depicted in FIG. 1.

The illustrated embodiment of the base station 130 includes a receiver (RX) 140 for receiving signals conveyed over an uplink from the user equipment 125 and a transmitter (TX) 145 for transmitting signals over a downlink to the user equipment 125. For example, the transmitter 145 may be used to transmit signals representative of adaptive bit rate streaming content requested by user equipment 125. The base station 130 also includes a scheduler 150 that is used to allocate transmission time slots (or other air interface resources such as frequencies, subcarriers, tones, and the like) for transmission over the air interface. Some embodiments of the radio link scheduler 150 allocate transmission time slots to associated user equipment 125 with a filled transmit queue. For example, the scheduler 150 may allocate transmission time slots or other resources using algorithms that include, but are not limited to, Max-Rate, Proportional Fair, and Alpha-Proportional Fair schedulers.

The scheduler 150 shown in FIG. 1 may receive two input variables. First, the scheduler 150 may receive or generate the physical layer (PHY) rates (e.g., spectral efficiency) that represent the available capacity per user, per physical resource block (e.g., defined as a fixed number of OFDM subcarriers and symbols). Second, the scheduler 150 may receive or generate weights that indicate fairness or Quality-of-Service (QoS) constraints per mobile user. The scheduler 150 may then attempt to maximize the weighted sum rate over all I users based on the two inputs. In the illustrated embodiment, the scheduler 150 may assign a time-variant weight to each user to account for fairness and QoS constraints. Each weight is based on a global fairness parameter $\alpha \in [0,1]$ and on a user-specific QoS weight $c_i$. Different fairness modes are typically reflected by a strictly concave utility function:

$$U_i(\bar{r}_i) = \begin{cases} c_i \log(\bar{r}_i), & \alpha = 0 \\ \dfrac{c_i \bar{r}_i^\alpha}{\alpha}, & \text{otherwise} \end{cases} \quad (1)$$

based on the average PHY rate $\bar{r}_i$ of an arbitrary user i. Taking the derivative $U_i'$ of this utility function in $\bar{r}_i$ results in $$w_i := U_i'(\bar{r}_i) = \begin{cases} c_i/\bar{r}_i, & \alpha = 0 \\ c_i \bar{r}_i^{\alpha-1}, & \text{otherwise} \end{cases} \quad (2)$$

for the overall weight $w_i \in [0,1]$ of user i. The utility function in equation (1) represents max-rate scheduling for $\alpha=1$ and $\alpha=0$ results in the proportional fair scheduling rule. Inserting these relevant special cases in equation (2), leads to the weights $w_i = c_i/\bar{r}_i$ for proportional fair scheduling and to $w_i = c_i$ $\bar{r}_i$ for max-rate scheduling.

The scheduler 150 may also use information provided by the user equipment 125 to allocate resources for the adaptive bit rate transmissions. Some embodiments of the scheduler 150 may receive information indicating a bit rate (or bit rates) selected by one or more of user equipment 125. For example, each user equipment 125 may select a bit rate from the bit rates indicated in the manifest file 128. The selected bit rate may be indicated as a rate requirement (e.g., a number of bits per second) or a statistical priority that may be used to determine the likelihood that the scheduler 150 schedules different user equipment 125, e.g., using a weighted utility maximization algorithm as discussed herein. User equipment 125 may also select a duration (e.g., a number of segments) for receiving the data stream at the selected bit rate. The scheduler 150 may then allocate downlink transmission resources for transmitting the content encoded at the requested bit rate. Transmission resources may include time intervals, timeslots, frequencies, subcarriers, tones, resource blocks, codes and the like, or a combination of the above. For example, in wireless communication systems 100 that implement time division multiple access (TDMA), the scheduler 150 may allocate time intervals for transmission of one or more segments of the data stream. For another example, in wireless communication systems 100 that implement orthogonal frequency division multiplexing (OFDM), the scheduler 150 may allocate sub-carrier tones (which are defined by the subcarrier frequency and a time interval) for transmission of segments of the data stream. In case of 4G LTE, the wireless communication system 100 implements orthogonal frequency division multiple access (OFDMA), which may be described as a combination of frequency domain and TDMA. Resources in an OFDMA system are partitioned in the time-frequency space and the scheduler 150 assigns resource slots along the OFDM symbol index (e.g., the time dimension) as well as OFDM sub-carrier index (e.g., the frequency dimension). The base station 130 may then transmit the data stream at an average bit rate that corresponds to the selected bit rate for the selected duration using the allocated resources. For example, the scheduler 150 may schedule transmission of the data in the data stream for an upcoming time interval such as a time interval ranging from a millisecond to ten milliseconds. While the scheduled information is being transmitted, the scheduler 150 runs again and schedules transmission of the data in the data stream for the next time interval. The average data rate over one or more time intervals should correspond to the selected bit rate.

Some embodiments of the scheduler 150 may use information indicating the TCP window state of the different user equipment 125 to improve the scheduling. For example, if the TCP window state information indicates a starved user equipment 125 (e.g., a user that has not received any scheduled transmissions for selected time interval or less than a threshold amount of the allocated transmission resources) still has full buffers and therefore can continue to provide uninterrupted service to the user equipment 125, the scheduler 150 may not need to give this user equipment 125 a high priority for scheduling. However, the scheduler 150 may give the user equipment 125 a high priority for scheduling if the TCP window state information indicates that the starved user equipment 125 has empty buffers or buffers with a fullness below a threshold.

Figure 2:
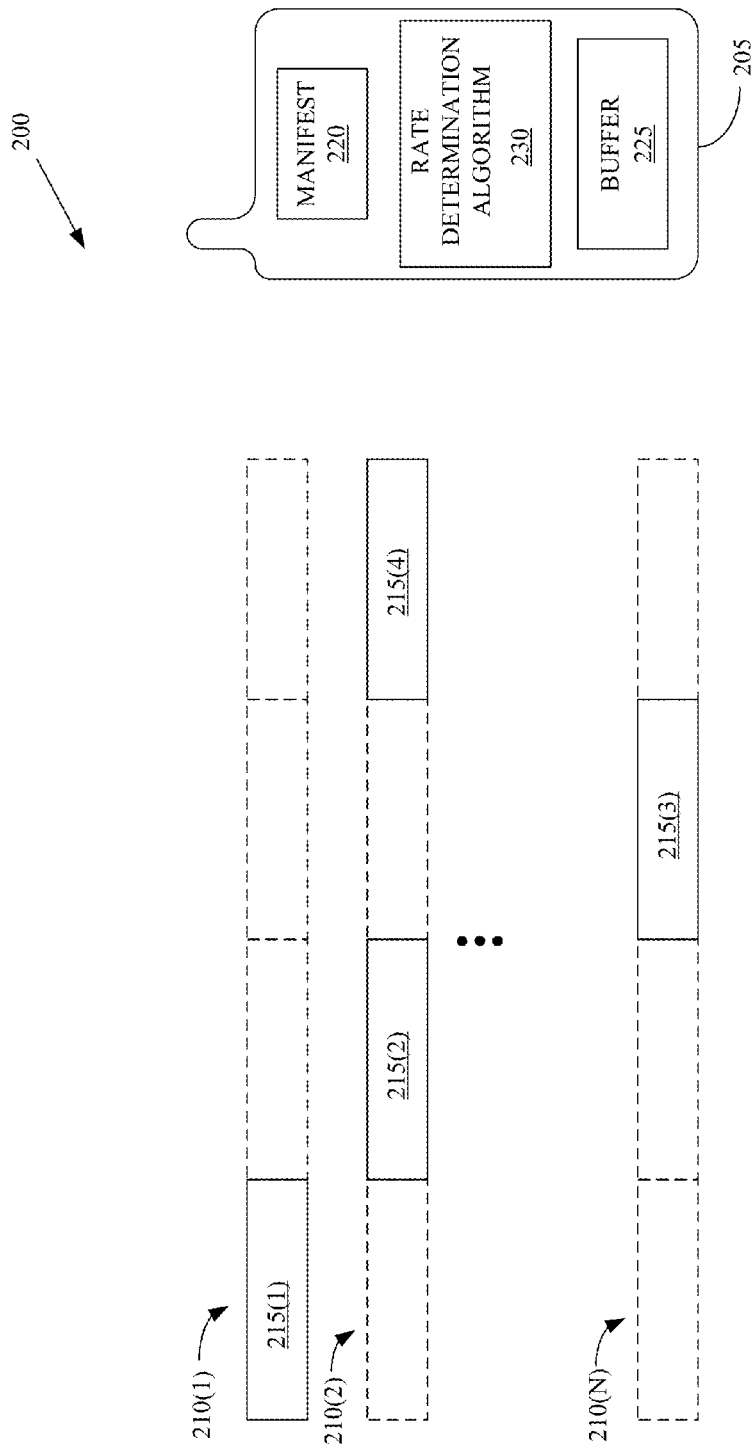
FIG. 2 conceptually illustrates a second exemplary embodiment of a wireless communication system that supports adaptive bit rate streaming.

FIG. 2 conceptually illustrates a second exemplary embodiment of a wireless communication system 200 that supports adaptive bit rate streaming. In the illustrated embodiment, user equipment 205 is receiving content using adaptive bit rate streaming and so user equipment 205 can select between different bit-rate streams 210. For example, the bit rate streams 210 may have bit rates that increase from a relatively low bit rate for the bit rate streams 210(1) to a relatively high bit rate for the bit rate stream 210(N). The bit rate streams 210 are also divided into segments 215. In the interest of clarity, only four segments 215 are indicated by a reference numeral in FIG. 2.

User equipment 205 may access or store a manifest file 220 holding information about available bitrates, encodings, segments, and specifics on how to request the content. Some embodiments of the user equipment 205 may retrieve or download the manifest file 220 from a server such as the server 120 shown in FIG. 1. The user equipment 205 implements a buffer 225 such as a fixed play buffer that may be used to control the presentation time for data stored in the buffer 225 and thereby smooth the user experience. Some embodiments of the buffer 225 may have sizes that allow the buffer 225 to store information representing content having a duration that ranges from 30 sec to 5 min. However, persons of ordinary skill in the art having benefit of the present disclosure should appreciate that the size of the buffer 225 is a matter of design choice and different user equipment 225 may implement different sizes of the buffer 225.

User equipment 205 also implements a Rate Determination Algorithm (RDA) 230 that may be used to select the bitrate for each segment (or group of segments) that user 225 requests from the server. Some embodiments of the rate determination algorithm 230 can choose the bit rate using preset logic, heuristics or thresholds along with current values of the fullness of the buffer 225, historic data for buffer fullness, or estimated available throughput bandwidth for received segments. For example, the rate determination algorithm 230 may select the low bit rate data stream 210(1) for the segment 215(1), a higher bit rate data stream 210(2) for the segment 215(2), the highest available bit rate data stream 210(N) for the segment 215(N), and then the lower bit rate data stream 210(2) for the segment 215(4). As discussed herein, the selected bit rates and the selected durations or segments can be communicated to the appropriate base station so that a scheduler in the base station can use this information to schedule downlink transmissions of the request the content or detect congestion of the air interface.

Some embodiments of user equipment 205 may be able to download or otherwise access and install a software add-on to an operating system implemented in the user equipment 205. The software add-on may be configurable to access the indications of the first bit rate, the size, and the play out duration from entities in the user equipment such as the manifest 220, the buffer 225, or the rate determination algorithm 230. The software add-on may also include functionality that supports transmission of this information over the air interface, as discussed herein.

Figure 3:
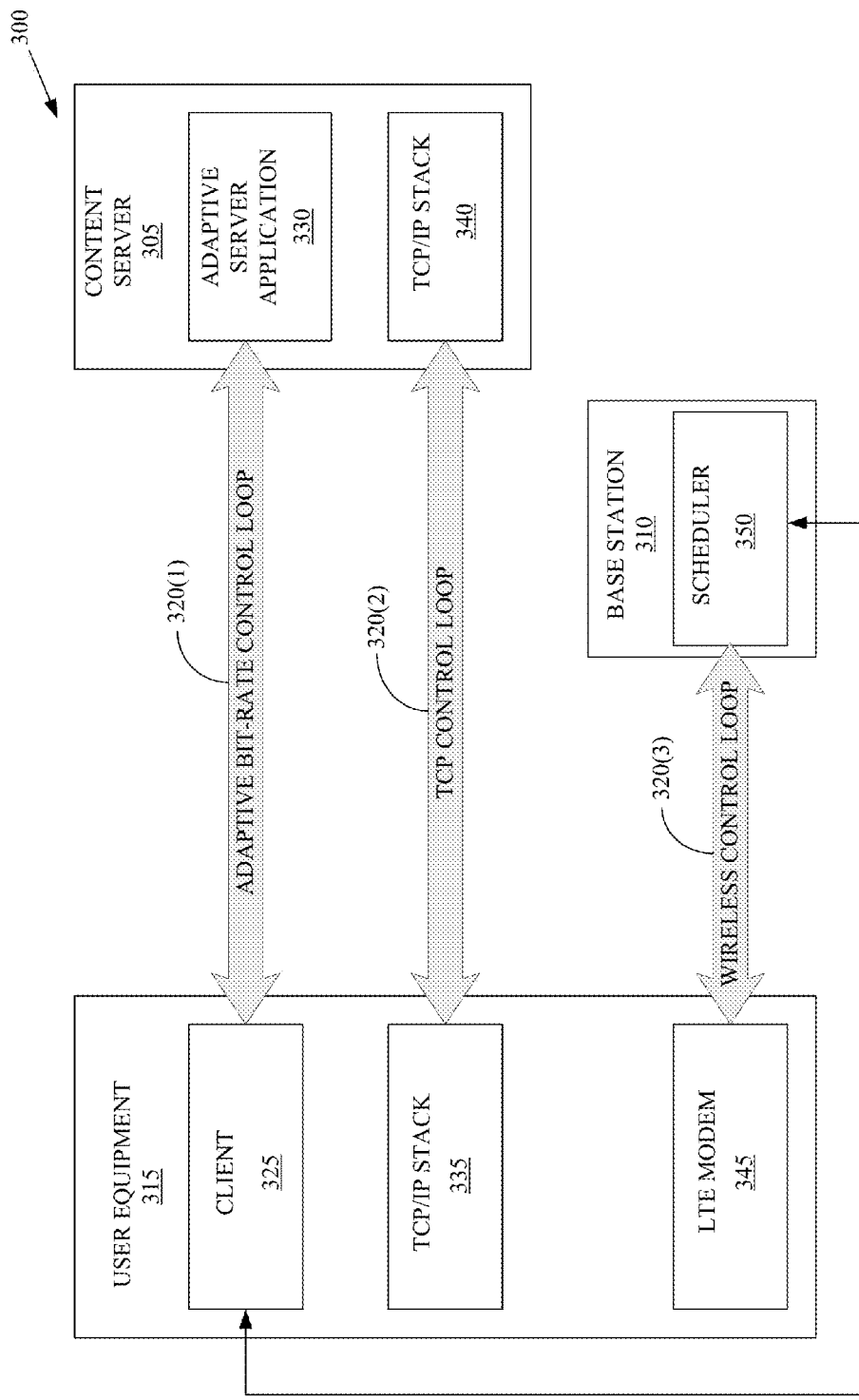
FIG. 3 conceptually illustrates a third exemplary embodiment of a wireless communication system that supports adaptive bit rate streaming.

FIG. 3 conceptually illustrates a third exemplary embodiment of a wireless communication system 300 that supports adaptive bit rate streaming. The illustrated embodiment of the wireless communication system 300 includes a content server 305 (which may correspond to the server 120 shown in FIG. 1), a base station 310 (which may correspond to the base station 130 shown in FIG. 1), and user equipment 315 (which may correspond to user equipment 125, 205 shown in FIGS. 1 and 2). FIG. 3 shows examples of control loops 320 that may be used to control and coordinate operation of the content server 305, the base station 310, with the user equipment 315 during adaptive bit rate streaming.

The first control loop 320(1) conveys signaling between the content server 305 and user equipment 315 to control and coordinate adaptive bit rate streaming. In the illustrated embodiment, user equipment 315 implements a client 325 for performing the functions related to adaptive bit rate streaming. For example, the client 325 may implement a rate determination algorithm such as the algorithm 230 shown in FIG. 2. The content server 305 implements a corresponding adaptive bit rate streaming application 330 that implements functionality including, but not limited to, receiving or hosting the multiple streams encoded at different bit rates and dividing the data streams into segments, as discussed herein. Signaling conveyed over the first control loop 320(1) may include information such as a manifest file indicating the available bit rates and requests from the client 325 for particular bit rates during selected segments.

The second control loop 320(2) conveys signaling related to the transmission control protocol/Internet protocol (TCP/IP) that is used to provide reliable ordered delivery of octets between the content server 305 and user equipment 315. In the illustrated embodiment, content server 305 and user equipment 315 implement corresponding TCP/IP stacks 335, 340 that communicate by exchanging signaling via the second control loop 320(2). For example, signaling conveyed over the second control loop 320(2) may be used to implement TCP congestion management between user equipment 315 and the content server 305. Some embodiments of the TCP/IP stacks 335, 340 may be used to generate TCP window state information, such as discussed herein.

The third control loop 320(3) conveys signaling related to scheduling communication between the base station 310 and user equipment 315. In the illustrated embodiment, user equipment 315 implements an LTE modem 345 for transmitting and receiving signals over the air interface and the base station 310 implements a scheduler 350 for scheduling transmissions over the air interface. Some embodiments of the scheduler 350 implement best effort scheduling of transmissions over the air interface. Application layer signaling between the client 325 and the application 330 (e.g., in the first control loop 320(1)) may be used in an attempt to match the selected bit rate for the encoded data stream with an available bandwidth that is estimated by the client 325. However, as discussed herein, the over the air link between the base station 310 and user equipment 315 may become a bottleneck for wireless communication due to suboptimal scheduling of the best effort traffic.

Suboptimal scheduling may occur when the third control loop 320(3) is out of sync with the first or second control loops 320(1-2). Conventional control loops 320(1-2) are disconnected from the control loop 320(3). The scheduler 350 may therefore have no visibility into the bitrates selected by the client 325 or the state of RDA implemented in the client 325. For example, the scheduler 350 may not know how tolerant the client 325 is to delays in packet delivery that may affect the ability of the client 325 to maintain stability of the quality of experience (QoE). For another example, the bit rate selected based upon the estimated available bandwidth may be out of sync with the actual available bandwidth that the scheduler 350 uses to schedule transmissions between the base station 310 and user equipment 315. Consequently the scheduler 350 may "unknowingly" with a high probability become a contributor to the instability of the QoE of the adaptive bit rate streaming service. Suboptimal scheduling may have a severe impact on quality of experience for adaptive bit rate streaming services.

The wireless communication system 300 may therefore be modified to support cooperation between the three control loops 320 shown in FIG. 3 by introducing direct or indirect signaling between user equipment 315 and the scheduler 350 implemented in the base station 310. Some embodiments of the wireless communication system 300 implement an interface 355 between the client 325 and the scheduler 350. The interface 355 can be used to convey information associated with the control loops 320 between the client 325 and the scheduler 350. For example, when the client 325 requests the next segment in the adaptive bit rate stream that is encoded at the bitrate selected by its RDA, the client 325 signals the RDA-selected bitrate of the segment and the play duration T (which indicates needed average air interface throughput during the next time interval 7) to the base station 310 or scheduler 350 over the interface 355. As discussed herein, the client 325 may signal the selected bit rate to the scheduler 350 as a rate requirement, a statistical priority, or some combination thereof.

Some embodiments of the client 325 may also provide additional information over the interface 355 such as a tolerable average throughput during the time interval T (e.g., an indication of how slowly the segment can be delivered without impacting the selected rate), and a TCP window state associated with the client 325, e.g., indications of the size of the congestion window or receive window associated with the client 325. Informing the base station 310 or the scheduler 350 about the state of TCP window may allow the scheduler 350 to take into account TCP window size and help avoid TCP window reset, thereby aligning the control loop 320(3) with the control loop 320(2).

The base station 310 or the scheduler 350 may use the provided information to coordinate scheduling of transmissions of the encoded data streams to the user equipment 315. The base station 310 or the scheduler 350 may also use this information to detect or predict congestion over the air interface that may occur when the sum of requested bitrates by all clients 325 associated with the base station 310 exceeds the air interface capacity of the base station 310. The scheduler 350 may respond to the existing or predicted congestion by allocating air interface resources such as timeslots to reduce or prevent congestion of the adaptive bit rate stream flows. For example, the scheduler 350 may use the advance knowledge of amount of data (e.g., the data indicated in the requested adaptive bit rate streams) that is expected to be transmitted to the user equipment 315, the tolerable throughput variation, and TCP window impact for each client 325 during the next T seconds to synchronize the control loop 320(3) with the control loops 320(1-2) over this time interval.

Figure 4:
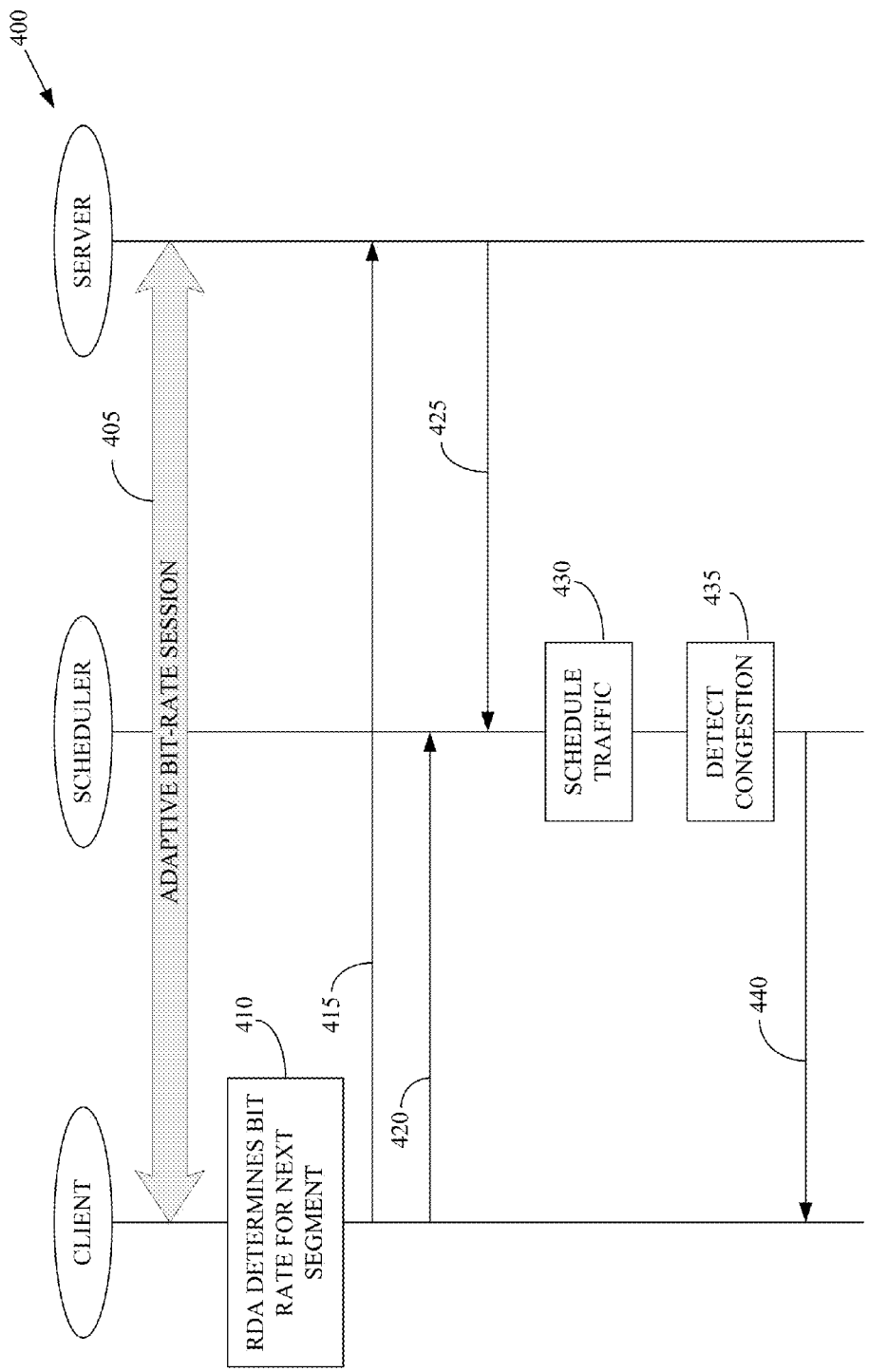
FIG. 4 conceptually illustrates one exemplary embodiment of a method for scheduling traffic and detecting congestion in adaptive bit rate streaming.

FIG. 4 conceptually illustrates one exemplary embodiment of a method 400 for scheduling traffic and detecting congestion in adaptive bit rate streaming. The embodiment of the method 400 shown in FIG. 4 depicts operations performed by and communication between a client implemented in user equipment, a scheduler implemented in a base station and an adaptive bit rate streaming content server. Some embodiments of the method 400 may be performed by the client 325, the scheduler 350, and the content server 305 shown in FIG. 3. In the illustrated embodiment, an adaptive bit rate session 405 has been established between the client, the scheduler, and the server. For example, the client may be receiving and playing segments of an audio, video, or multimedia session or downloading other content using a stream encoded at a selected bit rate.

A rate determination algorithm (RDA) implemented in the client may then determine (at 410) a bit rate for the next segment that will be transmitted during a subsequent time interval, as discussed herein. The client may therefore transmit (at 415) a request to the server to have the next segment (and possibly additional segments) transmitted at the new bit rate determined by the RDA. The client also transmits (at 420) information indicating the selected bit rate, the size of the requested segments, and the play out duration of the transmission at the selected bit rate (e.g., the number of segments) to the base station. For example, the client may transmit (at 420) information indicating the parameters used in the control loops 320(1-2) shown in FIG. 3. Exemplary parameters that may be transmitted (at 420) from the client to the base station include, but are not limited to, the selected bitrate of the newly requested segment(s), a segment play duration T that indicates a requested average throughput during the next time interval T, a tolerable average throughput during the time interval T that indicates how slowly the segment can be delivered without impacting the expected bitrate selection for the following subsequent segments, or a Client TCP window state.

Transmission (at 415, 420) of the adaptive bit rate streaming information from the client to the server and the base station may occur in different orders. Some embodiments may transmit (at 415) the information to the server prior to transmitting (at 420) information to the base station. Other embodiments may transmit (at 415) the information to the server simultaneously or concurrently with transmitting (at 420) information to the base station. The transmission (at 420) of the information may be performed using techniques such as media access control (MAC) level signaling between the client and the base station, application level signaling between a wireless service provider (WSP) downloadable application implemented in the user equipment and a dedicated server in the WSP network with further forwarding of this information to the scheduler, or a combination or variation thereof. For example, the information may be included in the payloads of IP messages transmitted between the user equipment and the base station.

The server provides (at 425) the requested adaptive bit rate data stream to the base station and the scheduler can schedule (at 430) transmission of the traffic over the air interface to the client, e.g., by allocating air interface resources for transmission of the adaptive bit rate data stream to the client. The scheduler may also perform (at 435) congestion detection for the client and any other clients or user equipment that are served by the base station. Some embodiments of the scheduler may detect (at 435) a current or future congestion condition if the weighted sum of the requested bitrates (which may be adjusted for the signal quality information that may indicate throughput for individual users and which may take into account user location relative to the base station, antenna geometry, topology and environment information) exceeds the over-the-air throughput capacity of the base station or at least the fraction of the base stations throughput capacity that has been allocated adaptive bit rate streaming. The scheduled transmissions may then be performed to provide (at 440) the adaptive bit rate stream to the client. Scheduling (at 430) of the traffic or congestion detection (at 435) may occur after the base station has received the requested segment(s) of the encoded adaptive bit rate data stream, before the adaptive bit rate stream is provided (at 440) to the client, or concurrently with ongoing reception or provision of the requested segment(s).

The scheduler can allocate air interface resources such as downlink transmission time slots to the users such that the congestion for adaptive bit rate streaming flows is reduced or avoided. Some embodiments of the scheduler may implement utility maximization as in equation (1), where the QoS weight c may be adjusted according to the requirements of the adaptive bit rate streaming flows. For example, the QoS weight c may be chosen to be proportional to the bitrate of the requested segment. If the requested bitrate of mobile user i and segment j is $V_{ij}$ and the overall cell capacity at Transmit Time Interval (TTI) t is R(t), the weight could be chosen as $c_i=V_{ij}/R(t)$. Note that c is used to compute the final weight w in equation (2) and, thus, any change in c affects the probability at which a mobile user is scheduled in the current time slot. Some embodiments of the scheduler may receive information indicating the QoS weight c from the RDA implemented in the user equipment, in which case the RDA may define the bit rate using a statistical priority represented by the QoS weight c.

Some embodiments of the scheduler may also implement utility maximization as in equation (1) with minimum rate constraints. In this case, the scheduler uses the QoS weight c as it is but maximizes the utility function given by equation (1) while assuring a given over-the-air throughput to certain users. Formally, for any user i, the scheduler maintains a rate constraint $r_i \geq V_{ij}$. Note that, unlike the first embodiments, minimum rate constraint algorithms guarantee that the bitrate for a segment j is supported as long as sufficient channel resources are available in the cell served by the base station. On the other hand, minimum rate constraint algorithms may result in inefficient channel use if a user is experiencing poor channel conditions. To meet the rate constraint, the scheduler may allocate a large quantity of resources to users in poor channel conditions. As it is likely that these resources provide higher throughput for other users, scheduling based on minimum rate constraints may come at the cost of decreasing spectral efficiency for the cell. To overcome this inefficiency of minimum rate constraints while still providing throughput guarantees, some schedulers may ignore users that are experiencing poor channel conditions for the current time slot to increase overall spectral efficiency. Such embodiments may implement the adjustable QoS weight for some users and the minimum rate constraints for other users. For example, the minimum rate constraint may be preferentially chosen for relatively high-priority users while users with relatively lower priorities may receive a statistical guarantee that may be implemented by increasing the scheduling wait for the relatively low priority users using the QoS weight c. Embodiments that implement this approach may provide a large benefit compared to current scheduler designs, which have no special treatment for users within their best effort traffic class.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
accessing, at user equipment, information comprising a first bit rate of a first stream selected by a rate determination algorithm implemented in the user equipment from a plurality of streams formed by encoding a portion of an adaptive multimedia stream using a plurality of bit rates;
accessing, at the user equipment, information comprising a size of the portion of the adaptive multimedia stream and a play out duration of the portion of the adaptive multimedia stream from a manifest file received by the user equipment from a server; and
providing, from the user equipment to a base station, the first bit rate of the first stream, the size of the portion of the adaptive multimedia stream, and the play out duration of the portion of the adaptive multimedia stream.

2. The method of claim 1, comprising accessing an indication generated by the rate determination algorithm that indicates a tolerable average throughput for the adaptive multimedia stream during the portion.

3. The method of claim 1, comprising accessing indications of a state of a transmission control protocol (TCP) window associated with user equipment, wherein the indications are provided by a TCP/IP stack implemented in the user equipment.

4. The method of claim 1, wherein providing the first bit rate of the first stream, the size of the portion of the adaptive multimedia stream, or the play out duration of the portion of the adaptive multimedia stream comprises providing the first bit rate of the first stream of the portion of the adaptive multimedia stream, the size of the portion of the adaptive multimedia stream, and the play out duration of the portion of the adaptive multimedia stream using media access control (MAC) level signaling generated by the user equipment.

5. The method of claim 1, wherein providing the first bit rate of the first stream, the size of the portion of the adaptive multimedia stream, or the play out duration of the portion of the adaptive multimedia stream comprises providing the first bit rate of the first stream, the size of the portion of the adaptive multimedia stream, and the play out duration of the portion of the adaptive multimedia stream in at least one payload of at least one IP message transmitted by the user equipment.

6. The method of claim 1, comprising downloading a software add-on to an operating system of the user equipment, wherein the software add-on is configurable to access the first bit rate of the first stream, the size of the portion of the adaptive multimedia stream, and the play out duration of the portion of the adaptive multimedia stream and transmit the first bit rate of the first stream, the size of the portion of the adaptive multimedia stream, and the play out duration of the portion of the adaptive multimedia stream.

7. A method, comprising:
receiving, at a base station from a user equipment, information comprising a first bit rate of a first stream selected by a rate determination algorithm implemented in the user equipment from a plurality of streams formed by encoding at least one portion of an adaptive multimedia stream using a plurality of bit rates, a size of the portion of the adaptive multimedia stream indicated in a manifest file received by the user equipment from a server, and a play out duration of the portion of the adaptive multimedia stream indicated in the manifest file; and
allocating, at the base station, at least one resource for transmission of said at least one portion of the adaptive multimedia stream to the user equipment based on the first bit rate of the first stream, the size of the portion of the adaptive multimedia stream, and the play out duration of the portion of the adaptive multimedia stream.

8. The method of claim 7, comprising receiving an indication generated by the rate determination algorithm that indicates a tolerable average throughput for the adaptive multimedia stream during said at least one portion.

9. The method of claim 7, comprising receiving indications of at least one state of a transmission control protocol (TCP) window associated the user equipment, wherein the indications are provided by at least one TCP/IP stack implemented in the user equipment.

10. The method of claim 7, comprising receiving the first bit rate of the first stream, the size of the portion of the adaptive multimedia stream, or the play out duration of the portion of the adaptive multimedia stream using media access control (MAC) level signaling.

11. The method of claim 7, comprising receiving the first bit rate of the first stream, the size of the portion of the adaptive multimedia stream, or the play out duration of the portion of the adaptive multimedia stream in at least one payload of at least one IP message.

12. The method of claim 7, comprising detecting a congestion condition based upon a weighted sum of the first bit rates requested by the user equipment and signal quality information indicative of throughputs associated with the user equipment.

13. The method of claim 7, wherein allocating said at least one resource comprises allocating said at least one resource using at least one of a proportional fair algorithm or a minimum rate constraint algorithm that is modified to allocate resources based on the first bit rate of the first stream, the size of the portion of the adaptive multimedia stream, and the play out duration of the portion of the adaptive multimedia stream.

14. The method of claim 13, comprising assigning weights for the proportional fair algorithm based upon the first bit rate or determining minimum rates for the minimum rate constraint algorithm based upon the first bit rate.

15. The method of claim 7, comprising transmitting the adaptive multimedia stream to the user equipment using said at least one allocated resource.

16. User equipment comprising:
a rate determination algorithm to select a first stream encoded at a first bit rate from a plurality of streams formed by encoding a portion of an adaptive multimedia stream using a plurality of bit rates
a processor to process a manifest file including information indicating a size of the portion of the adaptive multimedia stream and a play out duration of the portion of the adaptive multimedia stream, wherein the information in the manifest file is received from a server; and
a modem to transmit the first bit rate of the first stream, the size of the portion of the adaptive multimedia stream, and the play out duration of the portion of the adaptive multimedia stream to a base station.

17. The user equipment of claim 16, wherein the user equipment is configurable to access an indication generated by the rate determination algorithm that indicates a tolerable average throughput for the adaptive multimedia stream during the portion.

18. The user equipment of claim 16, wherein the user equipment is configurable to access indications of a state of a transmission control protocol (TCP) window associated with user equipment, wherein the indications are provided by a TCP/IP stack implemented in the user equipment.

19. The user equipment of claim 16, wherein the user equipment is configurable to provide the indications using media access control (MAC) level signaling.

20. The user equipment of claim 16, wherein the user equipment is configurable to provide the indications in at least one payload of at least one IP message.

21. The user equipment of claim 16, wherein the user equipment is configurable to download a software add-on to an operating system of the user equipment, wherein the software add-on is configurable to access the indications of the first bit rate, besides, and the play out duration and transmit the indications.

22. A base station, comprising:
a receiver configurable to receive information comprising a first bit rate of a first stream selected by a rate determination algorithm implemented in a user equipment from a plurality of streams formed by encoding at least one portion of an adaptive multimedia stream using a plurality of bit rates, a size of the portion of the adaptive multimedia stream indicated in a manifest file received by the user equipment from a server, and a play out duration of the portion of the adaptive multimedia stream indicated in the manifest file; and
a scheduler configured to allocate at least one resource for transmission of said at least one portion of the adaptive multimedia stream to the user equipment based on the first bit rate of the first stream, the size of the portion of the adaptive multimedia stream, and the play out duration of the portion of the adaptive multimedia stream.

23. The base station of claim 22, wherein the scheduler is configurable to receive an indication generated by the rate determination algorithm that indicates at least one tolerable average throughput for the adaptive multimedia stream during said at least one portion.

24. The base station of claim 22, wherein the receiver is configurable to receive indications of at least one state of a transmission control protocol (TCP) window associated the user equipment, wherein the indications are provided by at least one TCP/IP stack implemented in the user equipment.

25. The base station of claim 22, wherein the receiver is configurable to receive the first bit rate of the first stream, the size of the portion of the adaptive multimedia stream, or the play out duration of the portion of the adaptive multimedia stream using media access control (MAC) level signaling.

26. The base station of claim 22, wherein the receiver is configurable to receive the first bit rate of the first stream, the size of the portion of the adaptive multimedia stream, or the play out duration of the portion of the adaptive multimedia stream in at least one payload of at least one IP message.

27. The base station of claim 22, wherein the scheduler is configurable to detect a congestion condition based upon a weighted sum of the first bit rates requested by the user equipment and signal quality information indicative of throughputs associated with the user equipment.

28. The base station of claim 22, wherein the scheduler is configurable to allocate said at least one resource using at least one of a proportional fair algorithm or a minimum rate constraint algorithm that is modified to allocate resources based on the first bit rate of the first stream, the size of the portion of the adaptive multimedia stream, and the play out duration of the portion of the adaptive multimedia stream.

29. The base station of claim 28, wherein the scheduler is configurable to assign weights for the proportional fair algorithm based upon the first bit rate or wherein the scheduler is configurable to determine minimum rates for the minimum rate constraint algorithm based upon the first bit rate.

30. The base station of claim 22, comprising a transmitter configurable to transmit the adaptive multimedia stream to the user equipment using said at least one allocated resource.

* * * * *